United States Patent
Klug et al.

(10) Patent No.: US 6,665,100 B1
(45) Date of Patent: Dec. 16, 2003

(54) AUTOSTEREOSCOPIC THREE DIMENSIONAL DISPLAY USING HOLOGRAPHIC PROJECTION

(75) Inventors: Michael A. Klug, Austin, TX (US); Mark E. Holzbach, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/636,112

(22) Filed: Aug. 10, 2000

Related U.S. Application Data

(60) Provisional application No. 60/148,180, filed on Aug. 10, 1999.

(51) Int. Cl.[7] ................................................. G03H 1/26
(52) U.S. Cl. .......................... 359/23; 359/15; 359/25; 359/33; 359/443; 359/462
(58) Field of Search ........................ 359/15, 16, 19, 359/20, 23, 24, 25, 33, 443, 462, 464

(56) References Cited

U.S. PATENT DOCUMENTS

| | | | | | |
|---|---|---|---|---|---|
| 3,479,111 A | * | 11/1969 | Gabor | ............................ | 352/44 |
| 4,037,919 A | * | 7/1977 | Takeda et al. | .................. | 359/9 |
| 4,130,337 A | * | 12/1978 | Okoshi | ........................... | 359/23 |
| 4,799,739 A | * | 1/1989 | Newswanger | ................. | 359/15 |
| 5,004,335 A | * | 4/1991 | Montes | .......................... | 352/58 |
| 5,112,121 A | * | 5/1992 | Chang | ........................... | 359/15 |
| 5,379,133 A | * | 1/1995 | Kirk | .............................. | 359/15 |
| 5,600,454 A | * | 2/1997 | Trayner | ........................ | 359/15 |
| 5,663,816 A | | 9/1997 | Chen et al. | ..................... | 359/15 |
| 5,886,675 A | * | 3/1999 | Aye et al. | ....................... | 345/7 |
| 5,930,037 A | * | 7/1999 | Imaii | ........................... | 359/463 |
| 5,991,073 A | * | 11/1999 | Woodgate et al. | ........... | 359/463 |
| 6,081,354 A | | 6/2000 | Gambogi, Jr. et al. | ......... | 359/15 |
| 6,095,652 A | * | 8/2000 | Trayner | ........................ | 353/10 |
| 6,101,008 A | | 8/2000 | Popovich | ...................... | 359/15 |
| 6,124,954 A | | 9/2000 | Popovich et al. | .............. | 359/13 |
| 6,211,976 B1 | | 4/2001 | Popovich et al. | .............. | 359/15 |
| 6,229,561 B1 | * | 5/2001 | Son et al. | ...................... | 348/41 |
| 6,229,562 B1 | * | 5/2001 | Kremen | ........................ | 348/51 |
| 6,233,071 B1 | * | 5/2001 | Orr | ................................ | 359/23 |
| 6,330,088 B1 | * | 12/2001 | Klug | ............................ | 359/23 |

* cited by examiner

Primary Examiner—John Juba
Assistant Examiner—Leo Boutsikaris
(74) Attorney, Agent, or Firm—Campbell Stephenson Ascolese LLP; Marc R. Ascolese

(57) ABSTRACT

Large format, highly selective display screens can be formed from a plurality of holographic optical elements. In accordance with the teachings of the present invention, systems and methods are described to provide a holographic screen for display of static and/or dynamic projected conventional two-dimensional images, two-dimensional stereograms, and holographic stereograms. One aspect of the present invention includes presenting live-image three-dimensional displays using an array of two-dimensional data projectors. Another aspect includes projecting and enlarging static or dynamic source three-dimensional images (real objects, holograms, or other autostereoscopic images).

24 Claims, 13 Drawing Sheets single projector, single viewzone single projector, single viewzone

**single projector,
1D array of multiple viewzones
(optional extra space between viewzones)**

**single projector,
2D array of multiple viewzones
(optional extra space between viewzones)**

1D array of multiple projectors, single viewzone per projector

**1D array of multiple projectors,
1D array of multiple viewzones**

**1D array of multiple projectors,
2D array of multiple viewzones**

2D array of multiple projectors, single viewzone per projector

**2D array of multiple projectors,
1D array of multiple viewzones**

**2D array of multiple projectors,
2D array of multiple viewzones**

**2D array of multiple projectors,
2D array of multiple viewzones
(optional extra space between viewzones)

single point reflecting HOE 3D spatial image (multi-point) reflection + magnifying HOE

AUTOSTEREOSCOPIC THREE DIMENSIONAL DISPLAY USING HOLOGRAPHIC PROJECTION

This application claims the benefit of U.S. Provisional Application No. 60/148,180, filed Aug. 10, 1999, under 35 U.S.C. §119 (e). The above-referenced provisional application is hereby incorporated by reference herein in its entirety.

FIELD OF THE INVENTION

The present invention is related to holographic projection and display technology including apparatus and methods to provide three dimensional displays of live and/or static images which may be simultaneously viewed by one or more observers.

BACKGROUND OF THE INVENTION

The display of projected images, whether static or moving, and whether based on, for example, conventional two-dimensional imaging or two-dimensional stereograms, typically relies on the use of relatively simple display screens that diffusively reflect the projected light. Such devices (e.g., overhead projector and movie screens) provide little in the way of reflected or displayed image flexibility, because they are usually planar in geometry, and possess no significant variation in their diffusive display capabilities across the surface of the device. Such limitations are undesirable to those seeking to display projected information in exciting or interesting ways, and particularly to those seeking to display stereographic images. On the other hand, some very specialized display devices, such as concave mirrors, possesses highly selective display capabilities. For example, light projected at a concave mirror is generally focused to a single focal point, thereby limiting the viewability of projected image. Of course, concave mirror are example of the opposite extreme in display technology because they are so dependent upon viwing position for displaying a projected image. Moreover, the techniques discussed so far, are not particularly suited for displaying projected stereographic images.

In addition to the conventional diffusive materials used to display projected images, holographic optical elements have been used in very specific ways to aid the display of projected images, or at the very least projected light. Holographic optical elements are specialized holograms specifically designed to diffract light in a particular way. The primary purpose of a holographic optical element is to serve some general optical function, as opposed to providing a viewer with an apparently three dimensional image, as is typically the case with traditional holograms. For example, holographic optical elements can be designed to operate as lenses, diffusers, mirrors (concave, convex, or planar), or a variety of other optical elements. Holographic optical elements can also perform well as diffuse reflectors. For example, U.S. Pat. No. 5,663,816 describes the use of very small reflective holographic elements in liquid crystal displays (LCDs) for the purpose of illuminating the display using ambient light and/or backlighting.

Unfortunately, the use of holographic optical elements as reflective devices, has traditionally been limited to relatively small applications, for example in LCDs, because of the difficulties associated with manufacturing larger holographic optical elements.

Accordingly, it is desirable to have large scale, highly selective display devices for projected images, including projected conventional two-dimensional images, two-dimensional stereograms, and holographic stereograms.

SUMMARY OF THE INVENTION

It has been discovered that large format, highly selective display screens can be formed from a plurality of holographic optical elements. In accordance with the teachings of the present invention, systems and methods are described to provide a holographic screen for display of static and/or dynamic projected conventional two-dimensional images, two-dimensional stereograms, and holographic stereograms. One aspect of the present invention includes presenting live-image three-dimensional displays using an array of two-dimensional data projectors, Another aspect includes projecting and enlarging static or dynamic source three-dimensional images (real objects, holograms, or other autostereoscopic images).

Large-scale projection screens can be provided which are capable of displaying and synthesizing images from multiple live-image two-dimensional projectors to form a live-image autostereoscopic three-dimensional display which can be viewed simultaneously by multiple observers.

One aspect of the present invention includes production of holographic optical elements (HOEs) which can behave like conventional lenses, mirrors, and diffusers that are also unlimited in size. Even analogs of complex combinations of conventional lenses, mirrors and diffusers can be produced. Conventional custom-designed lenses, mirrors, and diffusers, or their combinations, can otherwise be cumbersome and expensive to produce, especially in large scale. An automated production system allows large-scale custom HOEs to be produced much more efficiently and inexpensively.

Accordingly, one aspect of the present invention provides a system for projecting an image comprising a screen formed from at least one holographic optical element, and at least one projector for directing an image onto the screen, the screen presenting at least one viewzone through which an observer can view the image.

Another aspect of the present invention provides a system for producing and observing at least one autostereoscopic image. The system includes a screen formed from a plurality of holographic optical elements, and at least two projectors for directing an autostereoscopic image onto the screen. The screen has at least two viewzones through which at least one observer may view the autostereoscopic image.

Still another aspect of the present invention provides a system for producing and observing at least one autostereoscopic holographic display. The system includes a screen formed from a plurality of holographic optical elements and a three-dimensional image source with light coming therefrom and impinging upon the screen. The holographic optical elements cooperate with each other to produce the at least one autostereoscopic holographic display using the impinging light. The screen has at least two viewzones through which at least one observer may view the autostereoscopic holographic display.

Still another aspect of the present invention provides a system for producing and observing an image. The system includes a screen formed from a plurality of holographic optical elements. The screen is operable to reconstruct at least one point from a single point source.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The capability of automatically producing holographic image displays which have full-color and full-parallax has recently been demonstrated in, for example, the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety. Notably, these displays are unlimited in size due to the associated segmented tiling system.

Figure 1:
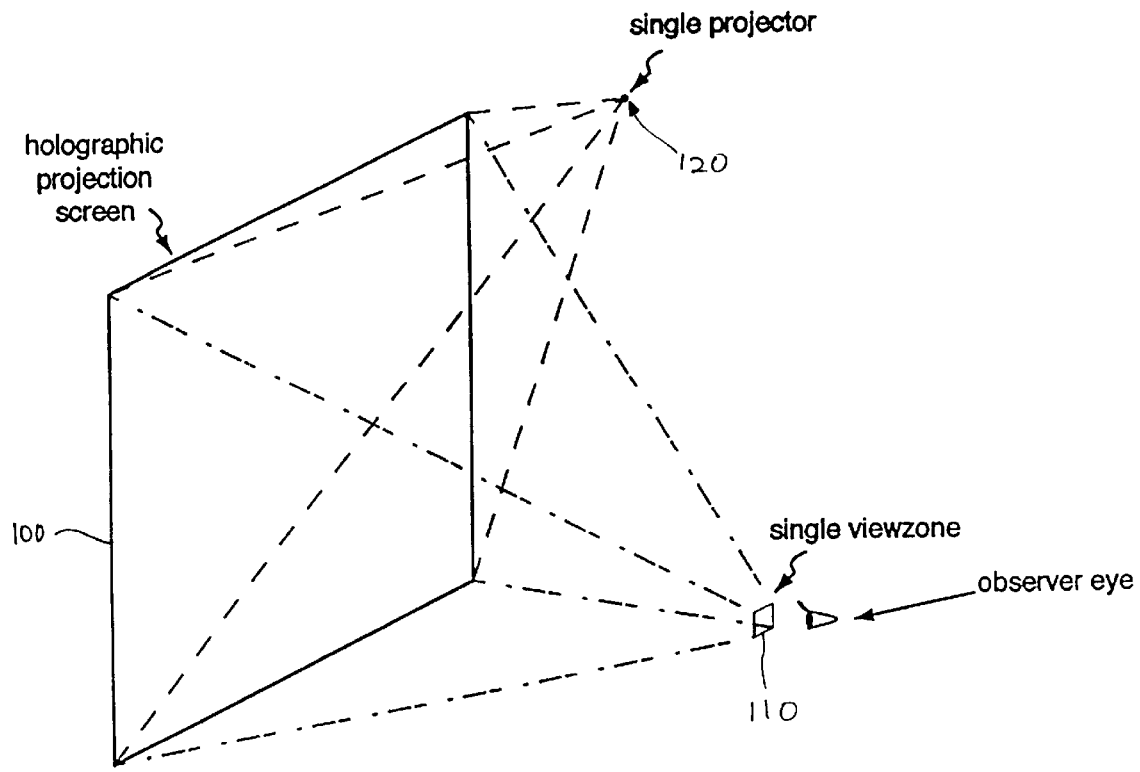
FIG. 1 is a schematic drawing with portions broken away showing an isometric view of a system having a single projector and a holographic projection screen for displaying a two-dimensional image which may be observed by an observer through a single viewzone.

The basic building block concept for a projection screen holographic optical element (HOE) formed in accordance with teachings of the present invention is the single-projector, single viewzone as illustrated in FIG. 1. When a holographic projection screen 100 is produced (at any scale) according to FIG. 1, then an observer in front of the screen will see the two-dimensional image from projector 120 within the a single viewzone 110. The single viewzone 110 acts like a small two-dimensional window located in three-dimensional space through which the observer can see the large image projected onto the screen 100. As with a small window or keyhole, if the observer is looking completely within the single viewzone 110, the observer will see the whole two-dimensional image from projector 120. If the observer is at a distance from the viewzone, the observer will only see the partial image that passes through the viewzone 110 at that distance. The observer will see no image when the eye's position relative to the viewzone 110 allows none of the projected (e.g., diffracted) rays of light to enter the eye, for example at eye positions in the same, plane as the viewzone 110 but not within it. When the observer's eye moves within the two-dimensional viewzone 110, a degree of parallax may be discernable depending on the scale of the viewzone relative to the eye's pupil diameter (approximately 3 mm). For example, in viewzone scales on the order of approximately 3 mm or less, little or no parallax will be discernable.

In the simplest case, holographic projection screen 100 can be fabricated by forming and recording an interference pattern in a holographic recording material. Here, the interference pattern would be formed by interference between a reference beam (a coherent point light source located with respect to the holographic recording material in a position comparable to the location of projector 120), and an object beam (a coherent light source located with respect to the holographic recording material in a position opposite that of viewzone 110). Additionally, the object beam comprises an image of a reflective surface, for example a white board or square, so that the hologran recorded is that of a reflective surface/pattern. Thus, when the hologram is "replayed," that is the hologram is positioned as holographic projection screen 100 with respect to projector 120 as shown, any image from projector 100 is viewable from viewzone 110 as if it is being projected onto a screen comprising the reflective surface/pattern used to form holographic projection screen 100.

In a preferred method of fabricating holographic projection screen 100, a one-step holographic printer is used, such as the printers disclosed in the aforementioned U.S. patent application Ser. No. 09/098,581. One-step hologram (including holographic stereogram) production technology has been used to satisfactorily record holograms without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Using such techniques reduces interference between respective viewzones, which is particularly important as the number of viewzones increases. Also, such techniques allow for much larger holographic projection screens to be formed.

Figure 2:
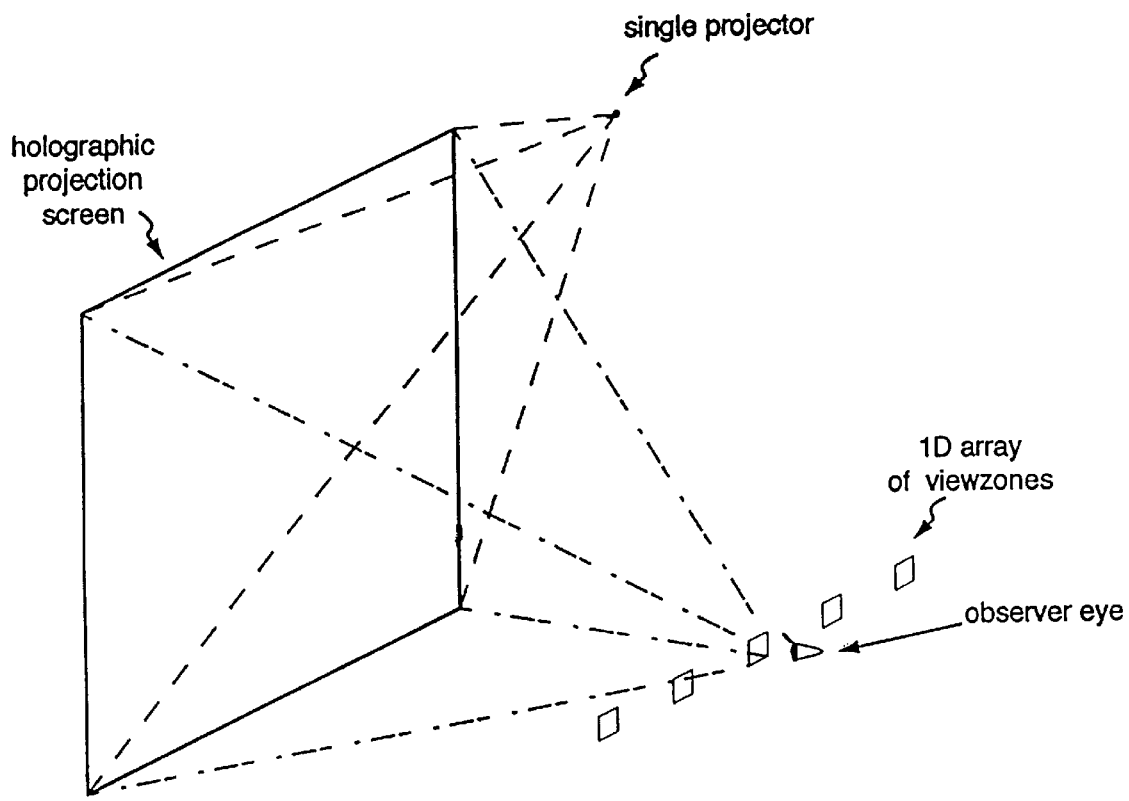
FIG. 2 is a schematic drawing with portions broken away showing a system having a single projector and a holographic projection screen which produces a one dimensional array of viewzones through which observers may view a two-dimensional image.
Figure 3:
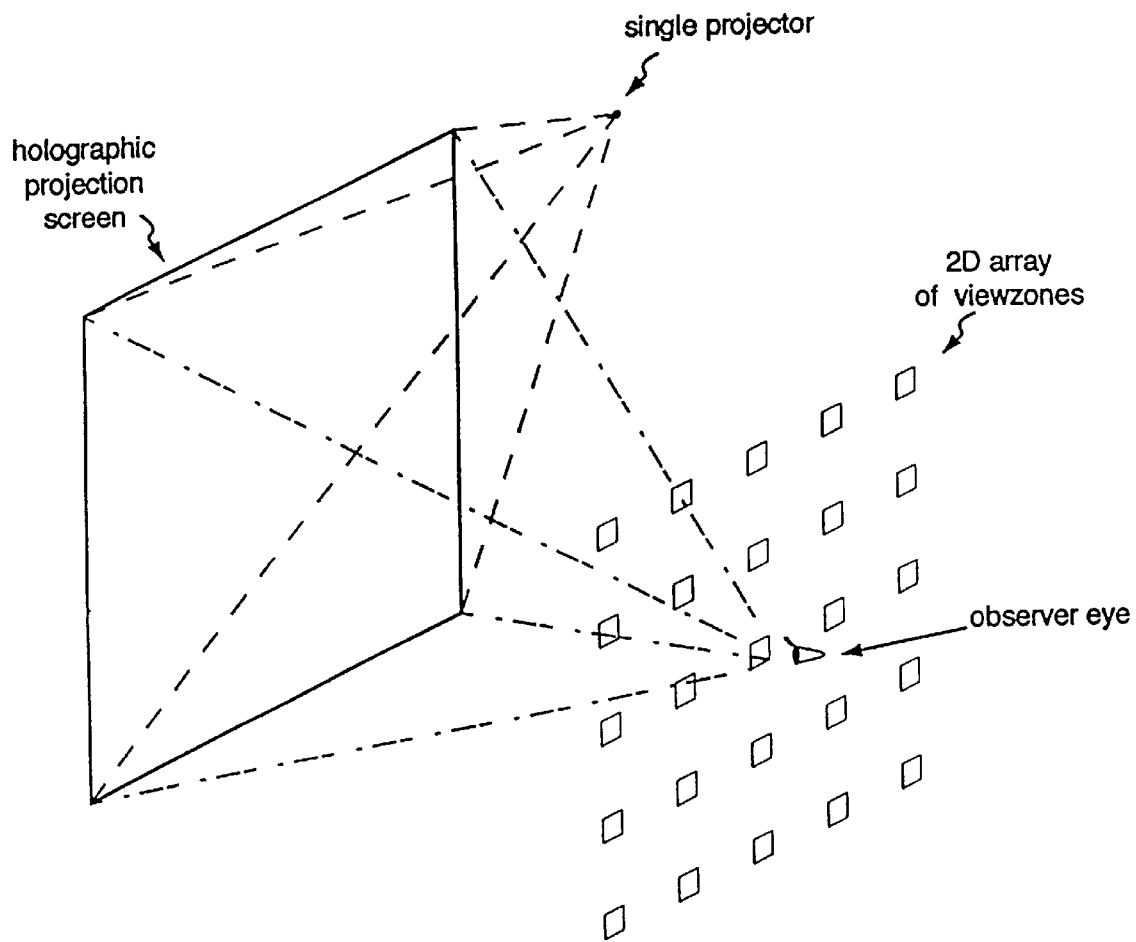
FIG. 3 is a schematic drawing with portions broken away showing a system having a single projector and a holographic projection screen which produces a two dimensional array of viewzones through which observers may view a two-dimensional image.

The FIG. 1 building block concept can next be extended to a multi-viewzone concept as illustrated in FIG. 2. Here, the observer will see the projected image when it is within one of the viewzones arranged as a one-dimensional array. Whenever the observer is not in line with any of the light rays directed through the viewzones, no projected image will be visible. Because there is a single projector, the same image will be visible within each of the viewzones. The space shown between the viewzones is optional. FIG. 3 extends the concept to a two-dimensional multiple viewzone configuration, and shows optional spaces between those viewzones.

Figure 4:
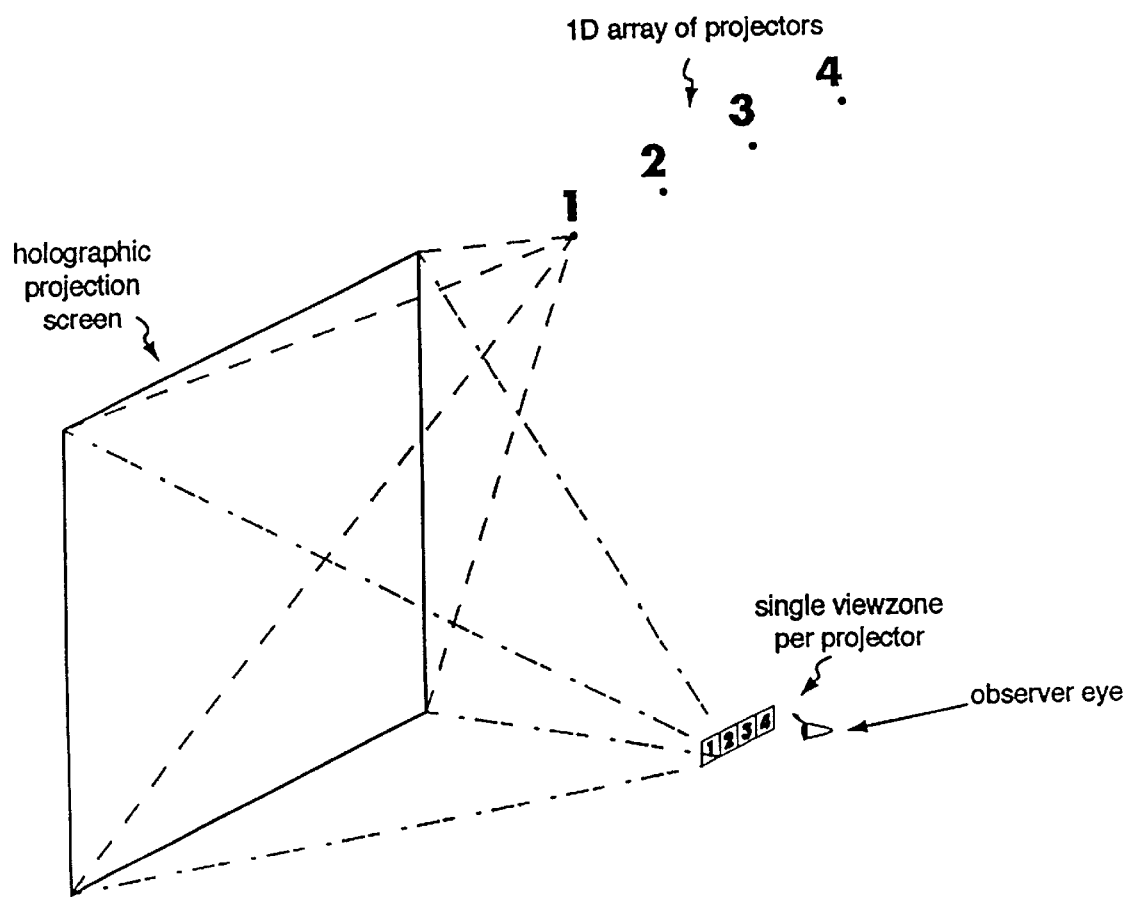
FIG. 4 is a schematic drawing with portions broken away showing a system having multiple projectors and a holographic projection screen which produces respective viewzones for each projector through which an observer may view one or more three-dimensional images.
Figure 5:
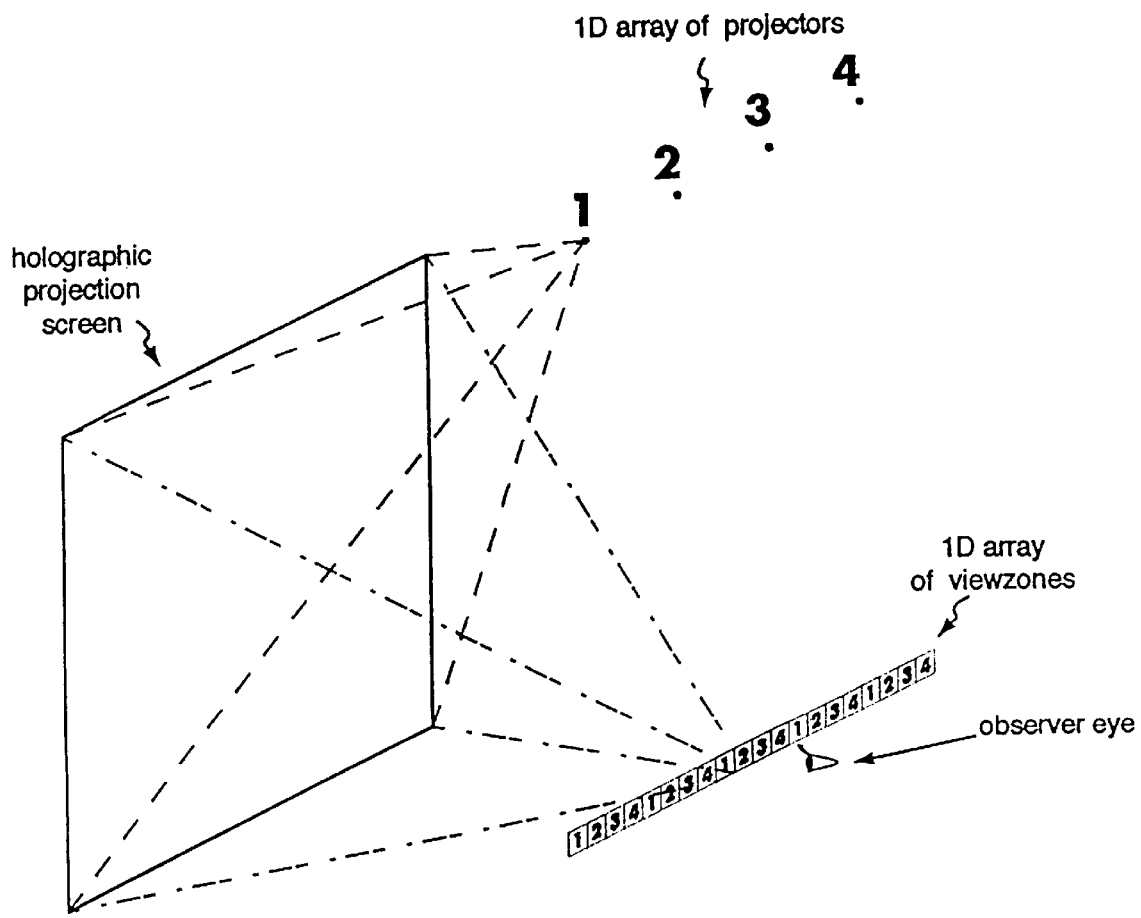
FIG. 5 is a schematic drawing with portions broken away showing a system having multiple projectors and a holographic projection screen which produces a one-dimensional array of multiple sets of viewzones with each set having a respective viewzone for each projector through which observers may view one or more three-dimensional images.
Figure 6:
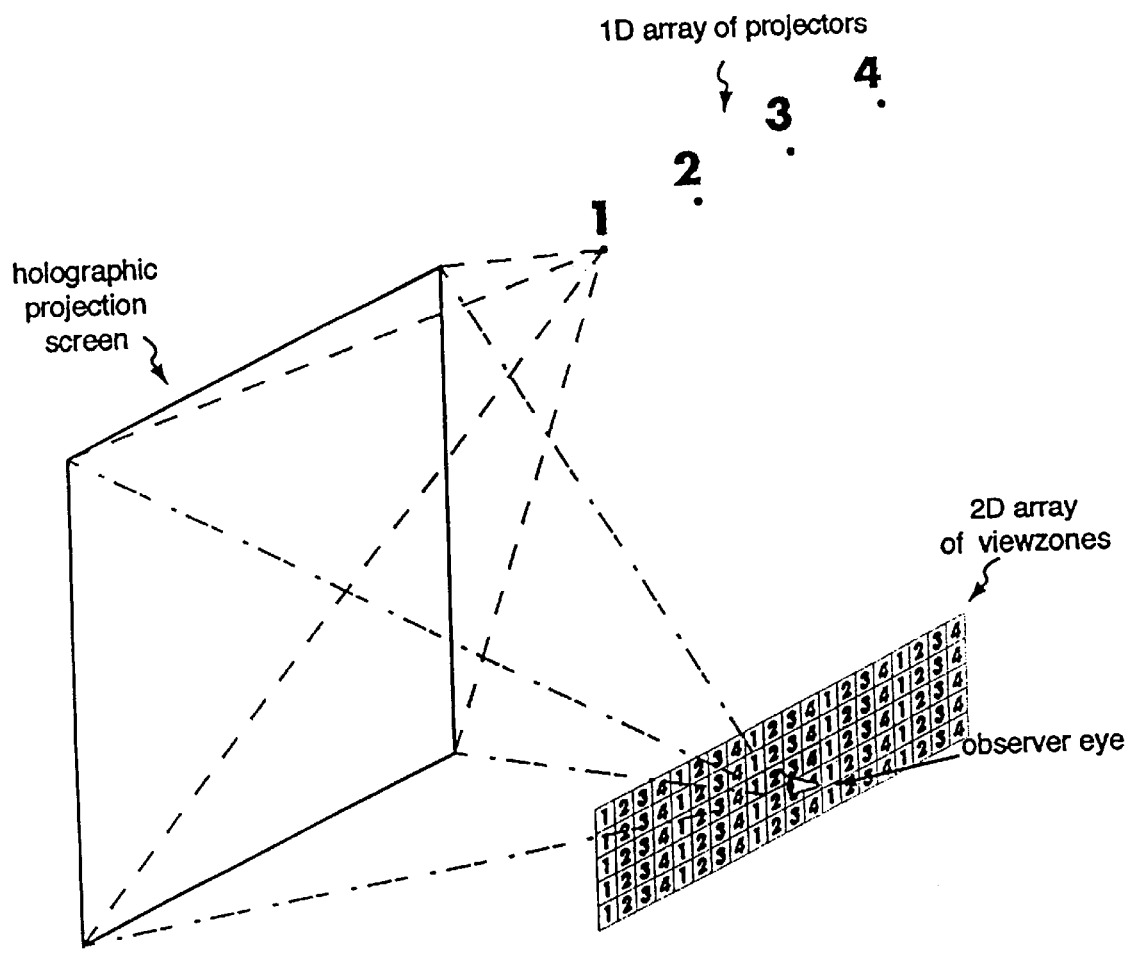
FIG. 6 is a schematic drawing with portions broken away showing a system having multiple projectors and a holographic projection screen which produces a two-dimensional array of multiple sets of viewzones with each set having a viewzone corresponding to a respective projector through which observers may view one or more three-dimensional images.

In order for an observer to perceive a display as a three-dimensional display, multiple views must be provided by multiple projectors such as is illustrated in FIG. 4. In this figure, the holographic screen is constructed such that each projector has its own individual viewzone. Since the views are arranged in a horizontal one-dimensional array, this kind of display would be a horizontal parallax only (HPO) display. In FIG. 5, the viewzones are multiplied and placed in a line to allow multiple observers standing side-by-side to view the HPO three-dimensional image simultaneously. In FIG. 6, viewzones are multiplied in a two dimensional array which would allow multiple observers at different vertical heights to stand side-by-side to view the same HPO three-dimensional image simultaneously.

Figure 7:
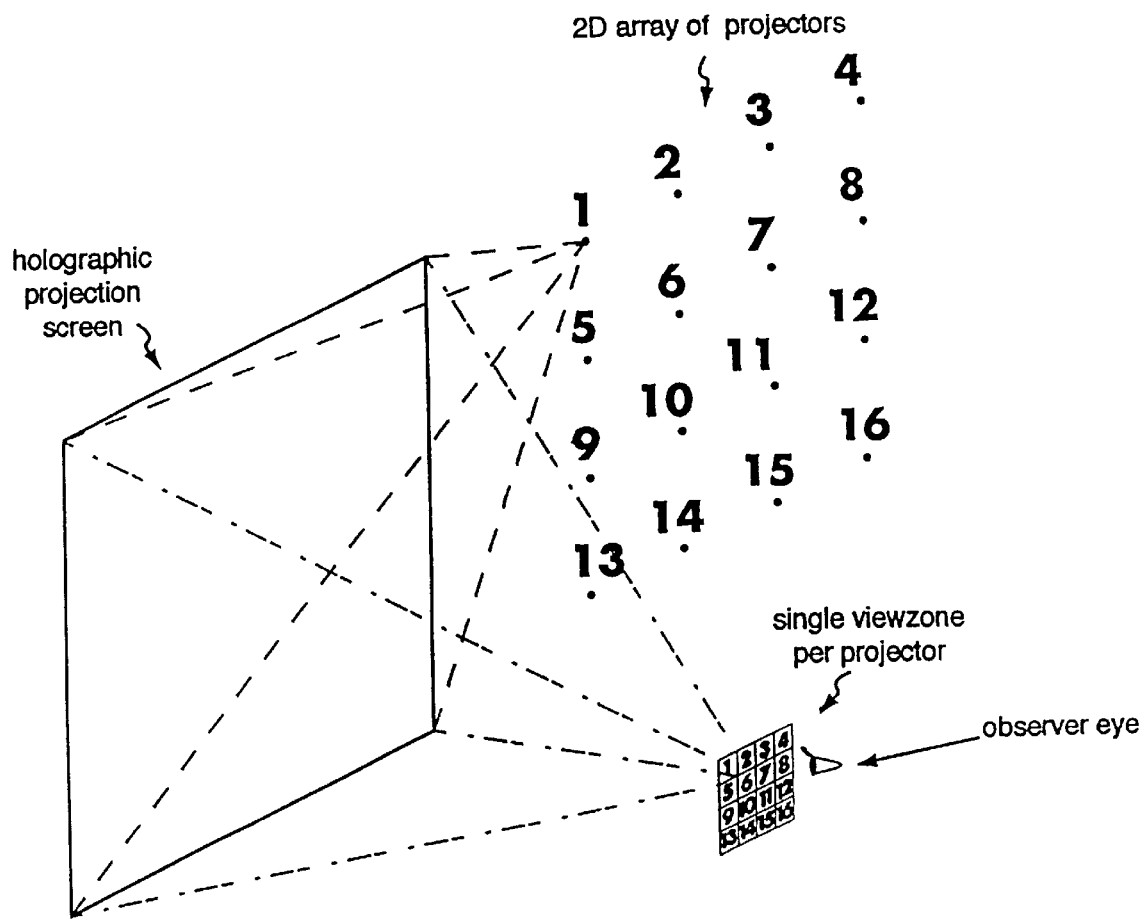
FIG. 7 is a schematic drawing with portions broken away showing a system having a two-dimensional array of projectors and a holographic projection screen which produces a two dimensional array of multiple sets of viewzones, each set having a viewzone corresponding with a respective projector through which observers may view one or more three-dimensional images.
Figure 8:
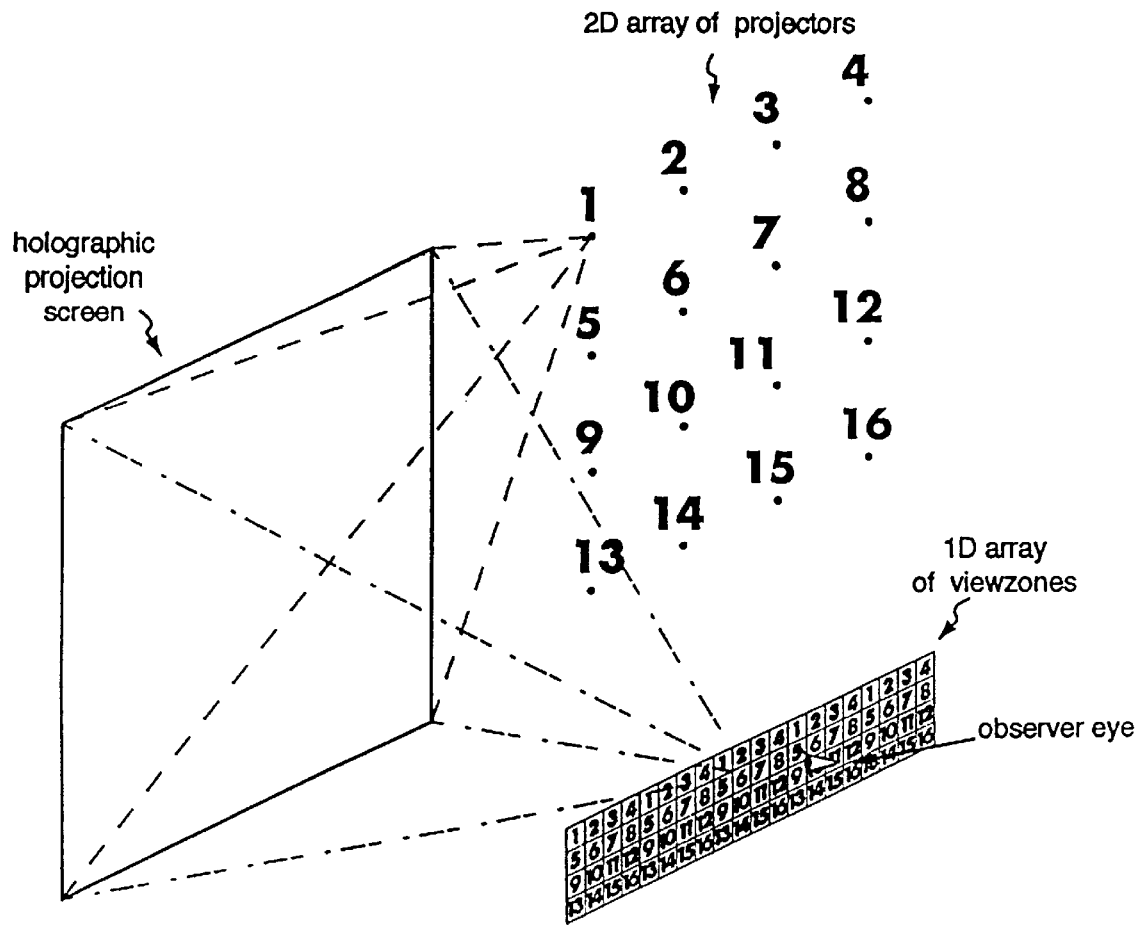
FIG. 8 is a schematic drawing with portions broken away showing a system having a two-dimensional array of projectors and a holographic projection screen which cooperate with each other to produce a one-dimensional array of sets of viewzones with each set having a viewzone corresponding with a respective projector through which observers may view one or more three-dimensional images.
Figure 9:
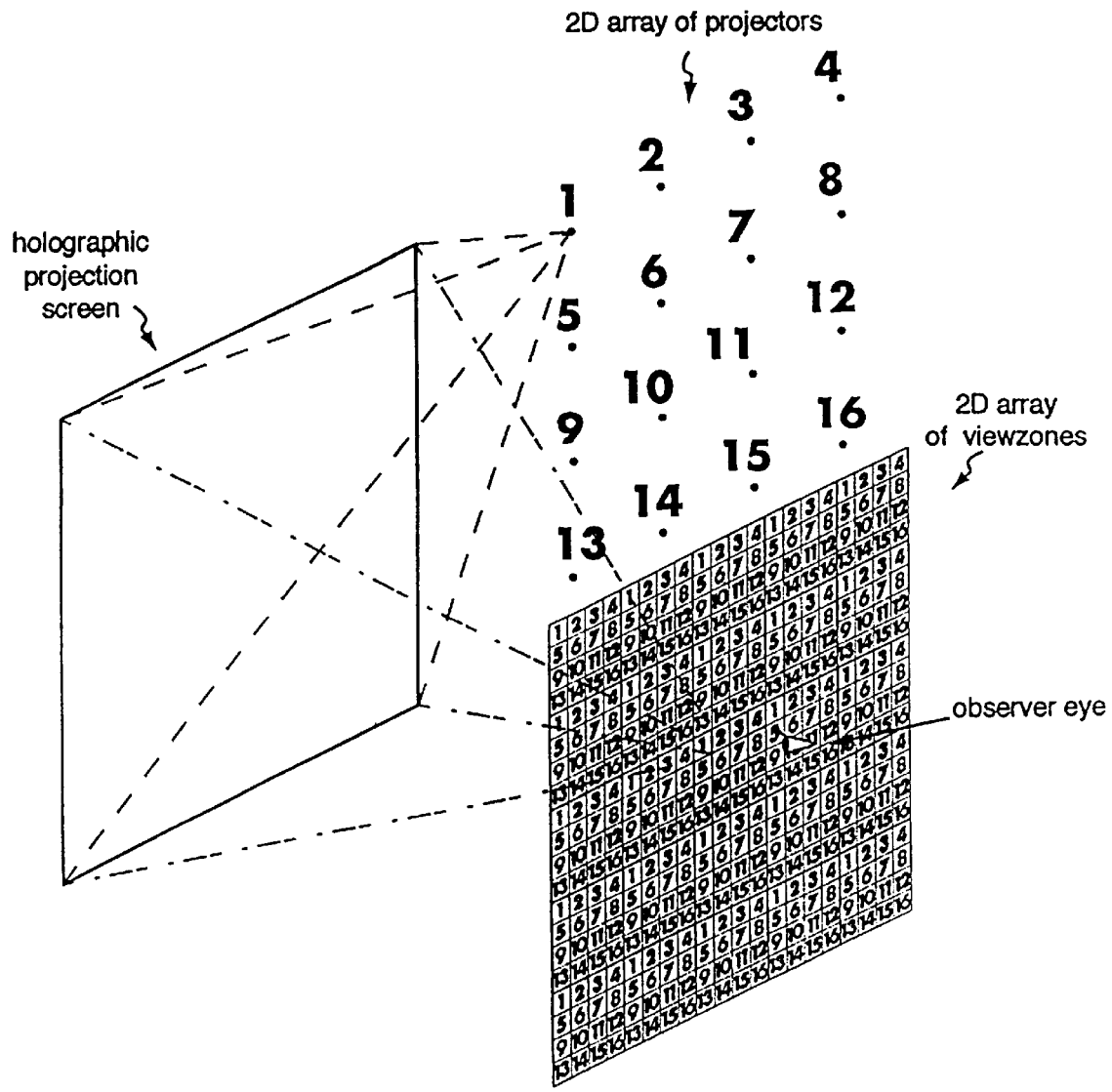
FIG. 9 is a schematic drawing with portions broken away showing a system having a two-dimensional array of projectors and a holographic projection screen which cooperate with each other to produce a two-dimensional array of sets of viewzones with each set having a viewzone corresponding with a respective projector through which respective observers may view one or more three-dimensional images.
Figure 10:
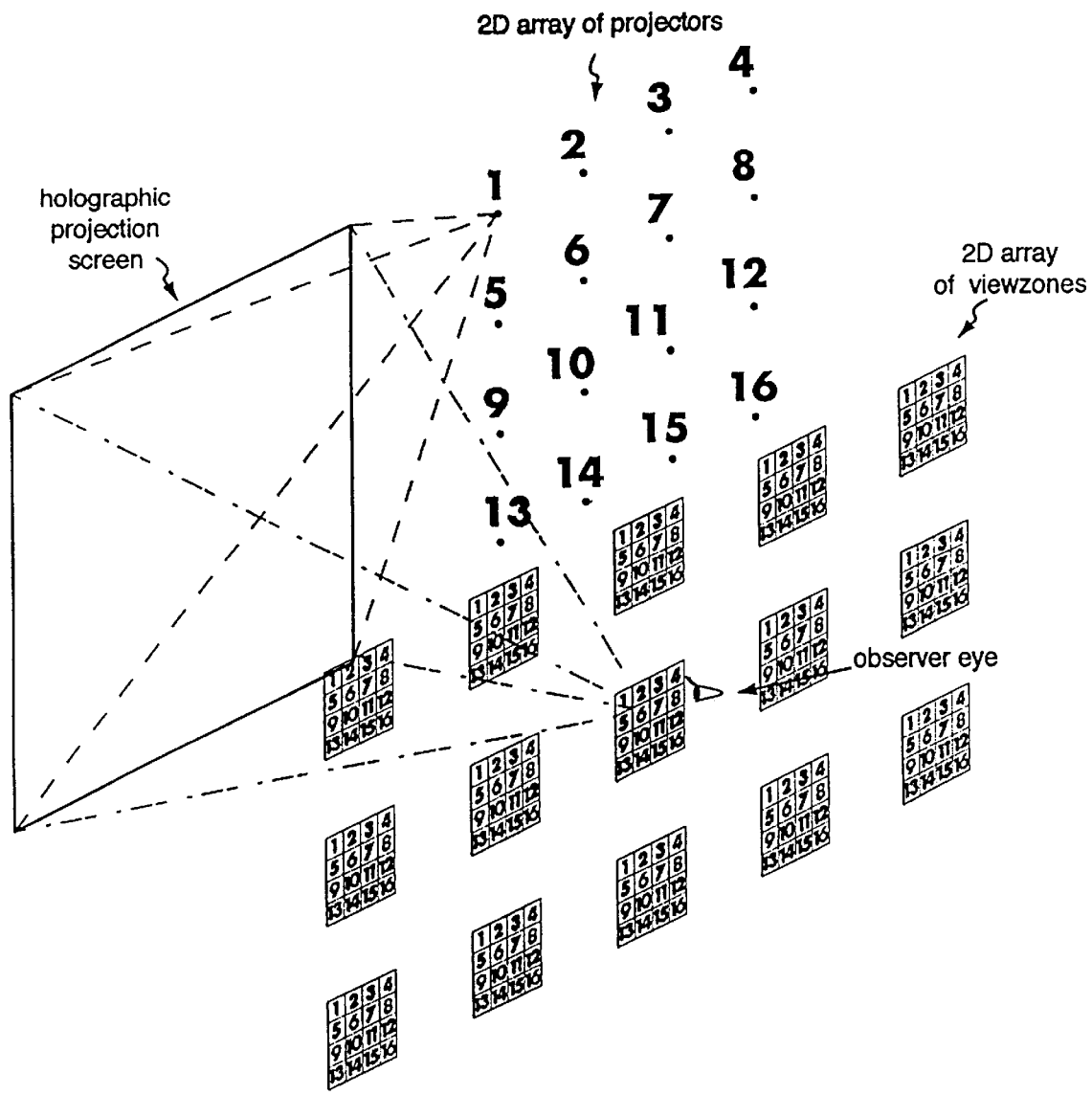
FIG. 10 is a schematic drawing with portions broken away showing a system having a two-dimensional array of projectors and a holographic projection screen which cooperate with each other to produce a two-dimensional array of sets of viewzones with optional open spaces between adjacent sets and each set having a viewzone corresponding with a respective projector through which observers may view one or more three-dimensional images.

FIG. 7 extends the concept even further, illustrating the concept of a two-dimensional array of projectors, each with its own individual viewzone, which creates a single-observer full-parallax three-dimensional display. In FIG. 8, the viewzones are multiplied into a one-dimensional array which would allow multiple observers standing side-by-side to see the full-parallax display. Since the viewzones have some vertical extent, observers with some height variation will be able to see the display. In FIG. 9, the viewzones are further multiplied in a two-dimensional array which would make it easier for multiple observers with even wider variation in height to be able to view the same full-parallax three-dimensional image simultaneously. If it is desirable to have the viewers spaced apart from each other within designated viewing zones, a configuration like the one shown in FIG. 10 can be constructed.

The number of the projectors, sizes, placements, and multiplication number of the viewzones can be increased to achieve more parallax and to accommodate a larger number of independent observers (the maximum number depending on the number of observers that can comfortably fit in the viewzones). Note that compared with simple stereo image pair three-dimensional projection, multiple viewzones allow for more relaxed viewing because the viewer can see the intended three-dimensional effect while moving their head between the adjacent viewzones. With stereo image pair projection, the observer must try to carefully maintain her head position in order to see the intended three-dimensional effect. Note also that this technique allows for very large three-dimensional images to be created.

The images provided by each projector must be created properly to achieve the desired moving three dimensional effect. For this purpose, the projectors should be synchronized. Video sources for the projectors can be from real-time computer graphics systems, pre-recorded video playback systems, real-time multiple camera feeds, or a combination of these.

Figure 11:
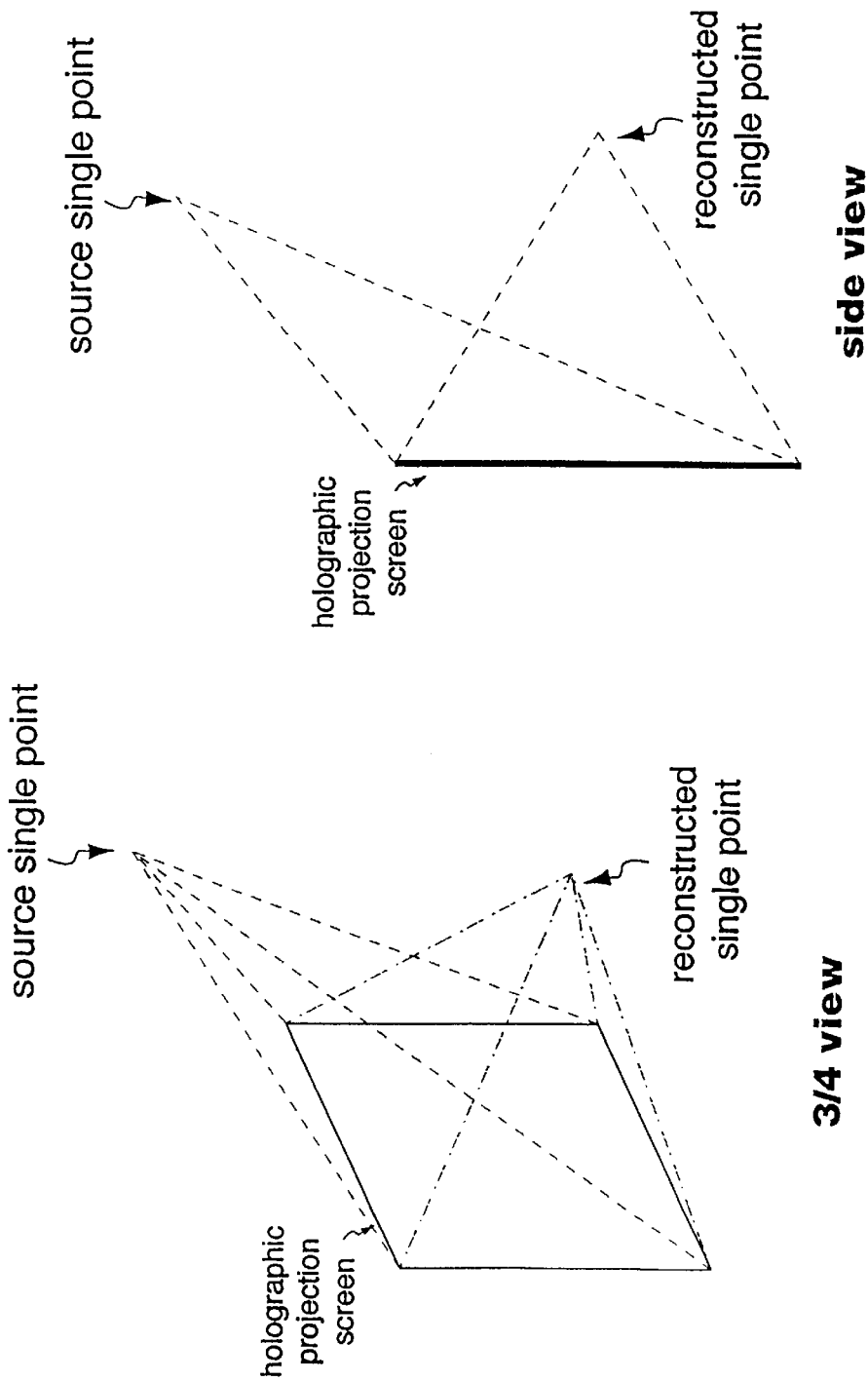
FIG. 11 shows schematic drawings with portions broken away of a system having a holographic projection screen which produces a reconstructed single point from a single point source.

An alternative three-dimensional projection technique is disclosed below which does not involve an array of two-dimensional image projectors or holographic viewzones. In this alternative technique, a large scale holographic off-axis mirror-lens (i.e., an HOE) is created as shown in FIG. 11. The technique to create this HOE (at any scale) has been described in above referenced U.S. patent application Ser. No. 09/098,581.

Figure 12:
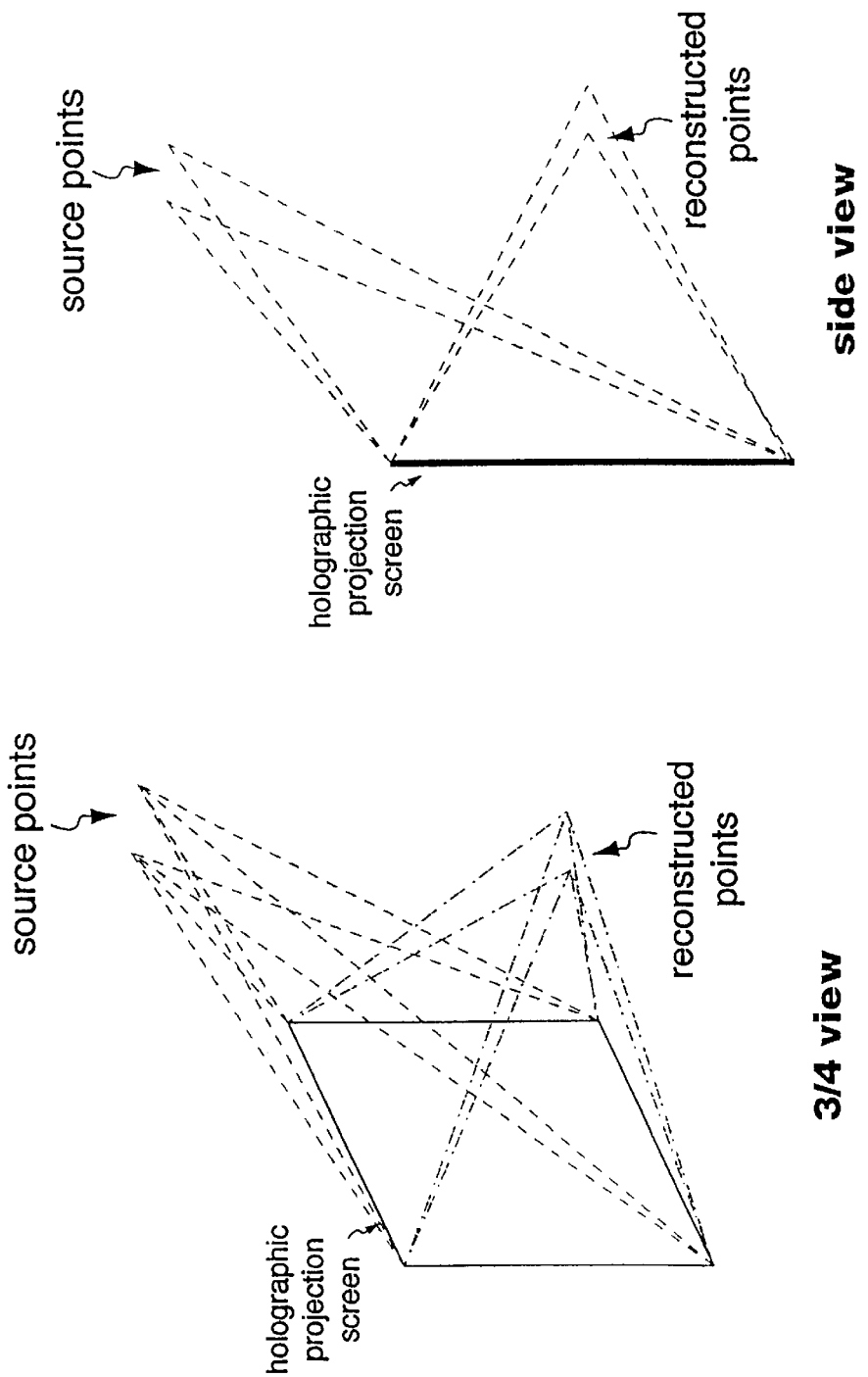
FIG. 12 shows schematic drawings with portions broken away of a system having a holographic projection screen which produces two or more reconstructed and magnified points from respective point sources.
Figure 13:
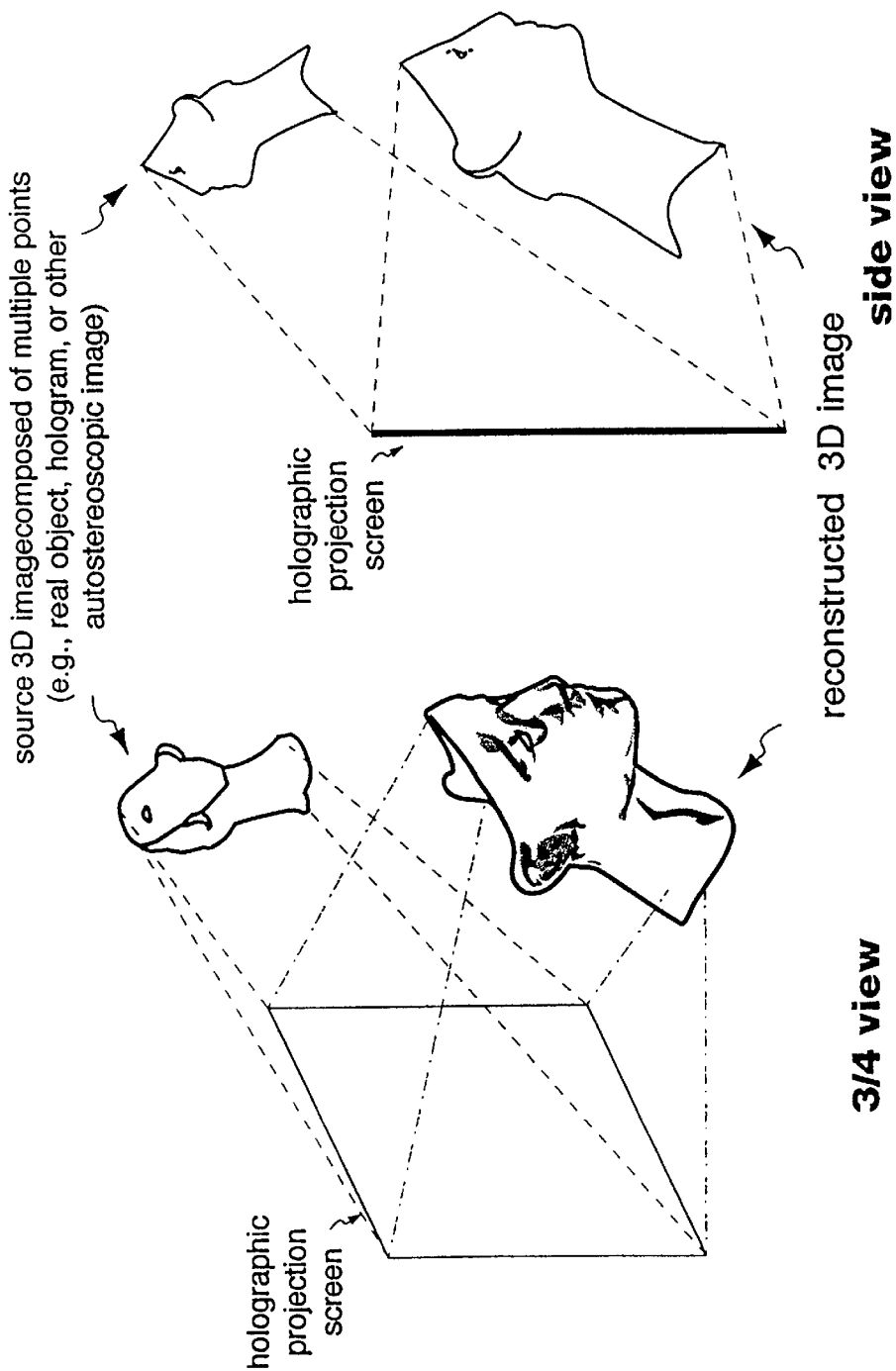
FIG. 13 shows schematic drawings with portions broken away of a system having a holographic projection screen which produces a magnified three-dimensional image from a three-dimensional source image having multiple points.

FIG. 12 shows the same HOE in FIG. 11. In FIG. 12, the HOE is illuminated with two source points instead of one, resulting in two reconstructed points with magnification. FIG. 13 shows the same HOE projecting and magnifying a complex three-dimensional image composed of multiple points. The three-dimensional image can be a real object, a smaller hologram, or another type of autostereoscopic image. The image can be static or dynamic, and the result projected.

Currently available technology often limits the physical dimension of an HOE to approximately 60 cm by 60 cm. In general, an HOE can not have dimensions larger than the film or holographic recording material used to produce it. Therefore, large scale holographic projection screens can be formed from an array of tiles having a desired HOE formed on each tile.

Although the disclosed embodiments have been described in detail, it should be understood that various changes, substitutions and alterations can be made to the embodiments without departing from their spirit and scope. In particular, those having ordinary skill in the art will readily recognize additional types of holographic optical elements, and techniques for constructing same, which can be used as holographic projection screens.

What is claimed is:

1. A system for projecting an image comprising:
   a screen formed from a plurality of holographic optical elements, at least one of the plurality of holographic optical elements being formed from a computer graphics image; and
   at least one projector for directing an image onto the screen, the screen presenting at least one viewzone through which an observer can view the image, the at least one viewzone being formed by the at least one of the plurality of holographic optical elements, and presenting a two-dimensional window appearing in space.

2. The system of claim 1 wherein the screen presents a one-dimensional
   array of viewzones through which the observer may view the image.

3. The system of claim 2 further comprising a plurality of spaces respectively disposed between the viewzones.

4. The system of claim 1 further comprising a two-dimensional array of multiple viewzones through which the observer may view the image.

5. The system of claim 4 further comprising a plurality of spaces respectively disposed between the viewzones.

6. The system of claim 1 further comprising at least two projectors with each projector directing a different image onto the screen.

7. The system of claim 1 further comprising:
at least two projectors with each projector directing a portion of the image onto the screen, wherein the screen displays the image as a single autostereoscopic image which the observer may view at the at least one viewzone.

8. A system for producing and observing at least one autostereoscopic image comprising:
a screen formed from a plurality of holographic optical elements, at least one of the plurality of holographic optical elements being formed from a computer graphics image;
at least two projectors for directing an autostereoscopic image onto the screen; and
the screen having at least two viewzones through which at least one observer may view the autostereoscopic image, wherein at least one of the at least two viewzones is formed by the at least one of the plurality of holographic optical elements, and presents a two-dimensional window appearing in space.

9. The system of claim 8 further comprising a plurality of sets of viewzones produced by the screen through which respective observers may view the autostereoscopic image.

10. The system of claim 9 further comprising a plurality of open spaces between adjacent sets of viewzones.

11. The system of claim 8 further comprising a two dimensional array of a plurality of sets of viewzones produced by the screen through which respective observers may view the autostereoscopic image.

12. The system of claim 8 further comprising a number of projectors and a corresponding number of viewzones produced by the screen through which at least one observer may view the autostereoscopic image.

13. The system of claim 12 further comprising at least one projector directing a portion of the autostereoscopic image onto the screen which is different from at least one other portion of autostereoscopic image directed onto the screen by another of the projectors.

14. The system of claim 8 further comprising:
a one dimensional array of projectors and the screen cooperating with each other to produce a one dimensional array of multiple sets of viewzones through which respective observers may view one or more autostereoscopic images; and
each set of viewzones having a respective viewzone corresponding with one of the projectors.

15. The system of claim 8 further comprising a two dimensional array of projectors and the screen cooperating with each other to produce a two dimensional array of viewzones having a respective viewzone corresponding with one of the projectors through which the at least one observer may view an autostereoscopic image.

16. The system of claim 8 further comprising:
a two dimensional array of projectors and the screen cooperating with each other to produce a one dimensional array of multiple sets of viewzones through which respective observers may view one or more autostereoscopic images; and
each set of viewzones having a respective viewzone corresponding with one of the projectors.

17. The system of claim 8 further comprising:
a two dimensional array of projectors and the screen cooperating with each other to produce a two dimensional array of multiple sets of viewzones through which respective observers may view one or more autostereoscopic images;
and each set of viewzones having a respective viewzone corresponding with one of the projectors.

18. The system of claim 8 further comprising:
a two dimensional array of projectors and the screen cooperating with each other to produce a two dimensional array of multiple sets of viewzones;
a plurality of open spaces disposed between adjacent sets of view zones to assist multiple observers in viewing one or more autostereoscopic images through respective sets of viewzones; and
each set of viewzones having a respective viewzone corresponding with one of the projectors.

19. The system of claim 8 further comprising at least two viewzones for observing a horizontal parallax only autostereoscopic image.

20. The system of claim 8 further comprising at least two viewzones for observing a full parallax autostereoscopic image.

21. The system of claim 8 further comprising the plurality of holographic optical elements cooperating with each other to produce the autostereoscopic image such that dimensions of the autostereoscopic image are smaller than dimensions of the screen.

22. The system of claim 8 further comprising the plurality of holographic optical elements cooperating with each other to display the autostereoscopic image such that dimensions of the autosteroscopic images are larger than dimensions of the screen.

23. The system of claim 8 wherein the screen comprises an array of tiles with a holographic optical element formed on each tile.

24. A system for producing and observing at least one autostereoscopic holographic display comprising:
a screen formed from a plurality of holographic optical elements, at least one of the plurality of holographic optical elements being formed from a computer graphics image;
a three-dimensional image source with light coming therefrom and impinging upon the screen;
the holographic optical elements cooperating with each other to produce the at least one autostereoscopic holographic display using the impinging light; and
the screen having at least two viewzones through which at least one observer may view the autostereoscopic holographic display, wherein at least one of the at least two viewzones is formed by the at least one of the plurality of holographic optical elements, and presents a two-dimensional window appearing in space.

* * * * *